US009315089B2

(12) United States Patent
Mori (10) Patent No.: US 9,315,089 B2
(45) Date of Patent: Apr. 19, 2016

(54) VEHICLE AIR-CONDITIONING CONTROL APPARATUS WITH IDLING STOP FUNCTION

(71) Applicant: CALSONIC KANSEI CORPORATION, Saitama-shi, Saitama (JP)

(72) Inventor: Yoshiteru Mori, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 683 days.

(21) Appl. No.: 13/659,372

(22) Filed: Oct. 24, 2012

(65) Prior Publication Data
US 2013/0098090 A1 Apr. 25, 2013

(30) Foreign Application Priority Data
Oct. 25, 2011 (JP) ................................. 2011-234009

(51) Int. Cl.
*B60H 1/00* (2006.01)
*B60H 1/32* (2006.01)

(52) U.S. Cl.
CPC ........ *B60H 1/00778* (2013.01); *B60H 1/00864* (2013.01); *B60H 1/322* (2013.01); *B60H 1/3208* (2013.01); *F25B 2327/001* (2013.01)

(58) Field of Classification Search
CPC .......... F25B 2327/00; F25B 2327/001; B60H 1/00378; B60H 1/00385; B60H 1/004; B60H 1/00664; B60H 1/00778; B60H 1/3208; B60H 1/322
See application file for complete search history.

(56) References Cited

U.S. PATENT DOCUMENTS

| 2002/0157414 | A1* | 10/2002 | Iwanami et al. ................ 62/239 |
| 2008/0041078 | A1 | 2/2008 | Choi |
| 2011/0114739 | A1 | 5/2011 | Misumi et al. |

FOREIGN PATENT DOCUMENTS

JP 2003-080937 A 3/2003

OTHER PUBLICATIONS

JP 2003-080937 (English Translation).*

* cited by examiner

*Primary Examiner* — Jonathan Bradford
(74) *Attorney, Agent, or Firm* — Foley & Lardner LLP (57) ABSTRACT

An air-conditioning unit for a vehicle that has an idling stop function includes a blower fan; first and second air-outlet ports configured to permit air blown from the blower fan toward first and second portions of a vehicle cabin, respectively; and an air-conditioning controller. The air-conditioning controller is configured to set a target air-outlet port temperature of the air blown from the ports on a basis of a preset temperature and an environmental condition of the vehicle; and, if the blower fan is operating to blow air from both of the ports before the vehicle is brought into an idling stop state, and then the vehicle is brought into the idling stop state, cause a controlled reduction in an air volume blown from at least one of the ports during the idling stop state; and cancel the controlled reduction when the idling stop state is cancelled.

22 Claims, 3 Drawing Sheets

VEHICLE AIR-CONDITIONING CONTROL APPARATUS WITH IDLING STOP FUNCTION

BACKGROUND

The present invention relates to a vehicle air-conditioning control apparatus configured to be used in a vehicle with a so-called idling stop function that stops an engine of the vehicle at the time of idling.

Recently, vehicles having an idling stop function that stops the engine of the vehicle at the time of idling for improving fuel efficiency are in practical use. In the vehicles having such an idling stop function, if the vehicle comes to a stop, the engine also comes to a stop, and hence a compressor driven by the engine comes to a stop, whereby a vehicle air-conditioning apparatus also comes to a stop. During a cooling operation, for example, if the engine comes to a stop, the cooling operation also comes to a stop. Hence the temperature in the vehicle cabin rises, which gives the driver or the passengers a feeling of discomfort.

In order to avoid the above circumstance, a vehicle air-conditioning control apparatus has been proposed which includes a second compressor driven by a battery, and is configured to continue the cooling operation by driving the second compressor with a motor at the time of engine stop (see JP-A-2003-080937). However, according to the air-conditioning control apparatus disclosed in JP-A-2003-080937, the second compressor, which is not driven by the engine, is required. As a result, the configuration of the air-conditioning apparatus becomes complicated, and hence a capability of mounting the air-conditioning apparatus on vehicles is more difficult. In addition, because electric power is needed to drive the second compressor, a problem of increasing power consumption may occur.

SUMMARY

In view of such circumstances, it is an object of the present invention to provide a vehicle air-conditioning control apparatus capable of increasing the time during which the comfort level is maintained even when the compressor comes to a stop at the time of an idling stop.

According to one embodiment of the present invention, an air-conditioning unit for a vehicle that has an idling stop function, may comprise: a blower fan configured to blow air; a first air-outlet port configured to permit air blown from the blower fan toward a first portion of a vehicle cabin; a second air-outlet port configured to permit air blown from the blower fan toward a second portion of the vehicle cabin; and an air-conditioning controller. The air-conditioning controller is configured to: set a target air-outlet port temperature of the air blown from the first and second air-outlet ports on a basis of a preset temperature and an environmental condition of the vehicle; if the blower fan is operating to blow air from both of the first and second air-outlet ports before the vehicle is brought into an idling stop state, and then the vehicle is brought into the idling stop state, cause a controlled reduction in an air volume blown from at least one of the first and second air-outlet ports during the idling stop state; and cancel the controlled reduction when the idling stop state is cancelled.

According to another embodiment of the present invention, an air-conditioning unit for a vehicle that has an idling stop function, may comprise: a blower fan configured to blow air into a vehicle cabin; a compressor, powered by a vehicle engine, configured to compress coolant; an evaporator configured to cool air blown from the blower fan using the coolant compressed by the compressor; a first air-outlet port configured to permit air blown from the blower fan toward an upper portion of the vehicle cabin; a second air-outlet port configured to permit air blown from the blower fan toward a lower portion of the vehicle cabin; and an air-conditioning controller. The air-conditioning controller is configured to: set a target air-outlet port temperature of air blown from the first and second air-outlet ports based on a temperature set by a vehicle passenger and an environmental condition of the vehicle; change an air volume to be blown by the blower fan; in a case where air is blown from both of the first and second air-outlet ports before the vehicle is brought into an idling stop state and then the vehicle is brought into the idling stop state, operate a control to reduce an air volume blown from one of the first and second air-outlet ports when the vehicle is brought into the idling stop state; and stop the control when the idling stop state is cancelled.

According to another embodiment of the present invention, a method of air-conditioning in a vehicle having an idling stop function, may comprise: blowing air through a first air-outlet port toward a first portion of a vehicle cabin and blowing air through a second air-outlet port toward a second portion of the vehicle cabin before an idling stop state; bringing the vehicle into the idling stop state; causing a controlled reduction in an air volume blown through at least one of the first and second air-outlet ports during the idling stop state; and canceling the controlled reduction when the idling stop state is cancelled.

According to another embodiment, if air is blown both from a first air-outlet port directed toward the upper body of the vehicle passenger and a second air-outlet port directed toward the foot of the vehicle passenger before the idling stop, the air-conditioning control unit may perform the control to reduce the blowing amount from one of the first and second air-outlet ports when the vehicle is brought into the idling stop state. Therefore, even in a state when the compressor comes to a stop because the engine comes to a stop, the air excluding the blowing volume from the one of the first and second air-outlet ports is cooled by the evaporator and is blown out from at least the other one of the first and second air-outlet ports. Consequently, the air needed to be cooled is reduced, which can make a temperature rise of the evaporator gentle, thereby the comfort level of the passenger can be maintained for a longer time.

It is to be understood that both the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

In a general sense, when an engine comes to a stop by an idling stop function, a compressor of an air-conditioning apparatus also comes to a stop. Therefore, the air-conditioning state in a cabin is deteriorated in an early stage and the time until the engine restarts becomes short. According to one embodiment of the present invention, when the air-conditioning control unit is in operation, if both of a vent door and a foot door are opened before the engine comes to an idling stop based on the determination of an idling stop control unit, one of the vent door and the foot door is closed when the engine comes to the stop.

Figure 1:
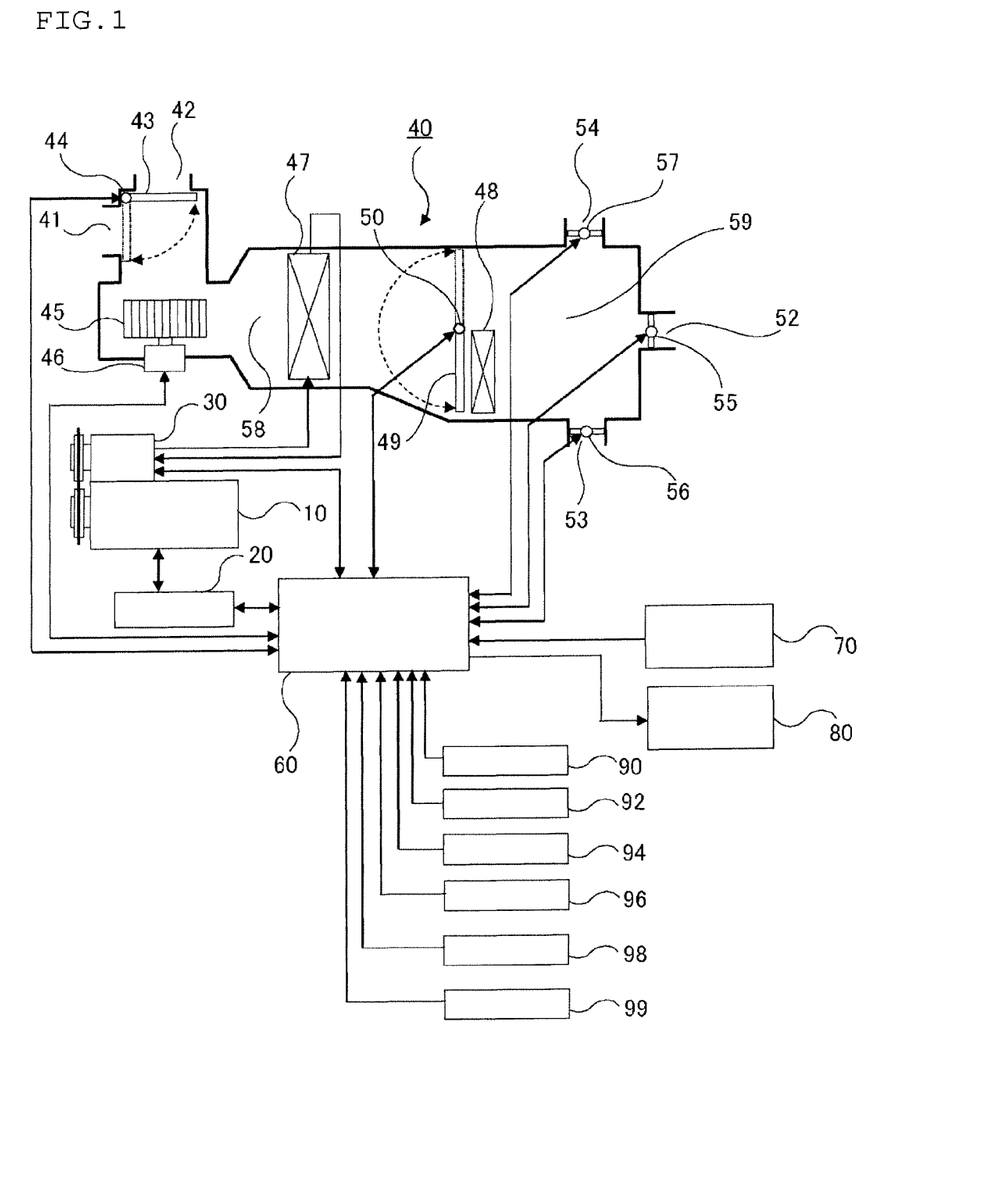
FIG. 1 is a block diagram illustrating a schematic configuration of a vehicle air-conditioning control apparatus according to an embodiment of the present invention.

Referring now to the drawings, a vehicle air-conditioning control apparatus according to one embodiment of the present invention will be described. Referring to FIG. 1, a vehicle air-conditioning control apparatus may be mounted on a vehicle having an idling stop function.

[Mechanical Configuration]

The vehicle air-conditioning control apparatus may be installed on a vehicle, not illustrated, and may include an engine 10, a compressor 30 and an air-conditioning unit 40.

The engine 10 generates a drive force used to cause the vehicle to run.

The compressor 30 may be driven by the engine 10 and compresses coolant.

The air-conditioning unit 40 is installed in a cabin and controls the air-conditioning state in the cabin. The air-conditioning unit 40 may include an outside air-inlet port 41, an inside air-inlet port 42, an intake door 43, an intake door drive unit 44, a blower fan 45, a blower motor 46, an evaporator 47 (which is a heat exchanger for cooling air), a heater core 48 (which is a heat exchanger for heating air), an air mix door 49, and an air mix door drive unit 50.

The outside air-inlet port 41 brings air from outside the vehicle.

The inside air-inlet port 42 brings air from inside the cabin.

The intake door 43 may be configured to be rotatable. The intake door 43 may be configured to switch the air flow between the inside air from the inside air-inlet port and the outside air from the outside air-inlet port or to determine the blend ratio of the inside air and the outside air.

The intake door drive unit 44 may rotate the intake door 43.

The blower fan 45 may be configured to blow the outside air, the inside air, or a mixture thereof (based on the position of the intake door 43) to an air channel 58 provided inside the air-conditioning unit 40.

The blower motor 46 may include an actuator such as a DC motor and is configured to rotate the blower fan 45.

The evaporator 47 may be configured to cool the air blown to the evaporator 47 by letting the coolant compressed by the compressor 30 pass through the evaporator 47 such that the coolant is evaporated.

The heater core 48 may be configured to heat the air blown to the heater core 48 by circulating cooling water sent from the engine 10 through a water channel in the heater core.

The air mix door 49 may be arranged between the evaporator 47 and the heater core 48. The air mix door 49 may be configured to control the blend ratio of the cold air having passed only through the evaporator 47 and the warm air having passed through the heater core 48 after passage through the evaporator 47 by changing the degree of opening of the air mix door 49.

The air mix door drive unit 50 may be configured to control the degree of opening of the air mix door 49 by rotating the air mix door 49.

Formed on the downstream side of the heater core 48 may be a mixing chamber 59 in which the cold air having passed only through the evaporator 47 and the warm air having passed through the heater core 48 are mixed.

The mixing chamber 59 may be provided with a vent air-outlet port 52 communicating with a vent grill (not illustrated), a foot air-outlet port 53 communicating with a foot grill (not illustrated) and a defroster air-outlet port 54 communicating with a defroster grill (not illustrated) in the cabin.

[Regulative Configuration]

The apparatus further may include an idling stop control unit 20 configured to perform an idling stop control of the vehicle, an air-conditioning control unit (that is, air-conditioning controller) 60 configured to control the air-conditioning unit 40, an air-conditioning operating unit 70, an air-conditioning display unit 80, an outside air temperature sensor 90, a cabin temperature sensor 92, an air-outlet port temperature sensor 94, a solar radiation amount sensor 96, a water temperature sensor 98, an evaporator temperature sensor 99, a vent door 55, a foot door 56 and a defroster door 57.

The air-conditioning operating unit 70 may be operable to set a temperature $T_a$ of the cabin by a vehicle passenger. The set temperature $T_a$ may be input into the air-conditioning control unit 60.

The outside air temperature sensor 90 may be configured to measure the outside temperature. The measured outside temperature may be input into the air-conditioning control unit 60.

The cabin temperature sensor 92 may be configured to measure the temperature of the cabin. The measured temperature of the cabin is input into the air-conditioning control unit 60.

The air-outlet port temperature sensor 94 may be configured to measure the temperatures at the vent air-outlet port 52, the foot air-outlet port 53 and the defroster air-outlet port 54, respectively. The measured temperatures at the vent air-outlet port 52, the foot air-outlet port 53 and the defroster air-outlet port 54 may be input into the air-conditioning control unit 60.

The solar radiation amount sensor 96 may be configured to measure a solar radiation amount radiated on the vehicle. The measured solar radiation amount may be input into the air-conditioning control unit 60.

The water temperature sensor 98 may be configured to measure the cooling water temperature of the engine 10. The measured water temperature may be input into the air-conditioning control unit 60.

The evaporator temperature sensor 99 may be configured to measure the temperature of the air after its passage through the evaporator 47. The measured temperature of the air after its passage through the evaporator 47 may be input into the air-conditioning control unit 60.

The idling stop control unit 20 may be configured to stop the engine 10 upon detection of the state that the vehicle is stopped and configured to restart the engine 10 in a case where, upon detection of driver's operations of an accelerator, a brake or a steering, or upon detection of temperature changes in the cabin or the like, predetermined conditions are satisfied. The control state (whether the vehicle is in the state of an idling stop or not) determined in the idling stop control unit 20 may be input into the air-conditioning control unit 60.

The air-conditioning control unit 60 may be configured to determine the air volumes to be blown out from the vent air-outlet port 52, the foot air-outlet port 53 and the defroster air-outlet port 54 on the basis of the control state determined in the idling stop control unit 20, the temperature $T_a$ set by the vehicle passenger using the air-conditioning operating unit 70 and the information input from the respective sensors described above. Also, the air-conditioning control unit 60 may be further configured to determine a blowing volume Q of the blower fan 45 for blowing the determined air volumes.

Furthermore, the air-conditioning control unit 60 may be configured to calculate the respective degrees of openings of the vent door 55, the foot door 56 and the defroster door 57 on the basis of the air volumes to be blown out from the vent air-outlet port 52, the foot air-outlet port 53 and the defroster air-outlet port 54 and to give a control instruction to change the degrees of openings to the vent door 55, the foot door 56 and the defroster door 57, respectively.

Moreover, the air-conditioning control unit 60 may be configured to calculate the rotational speed of the blower fan 45 (hereinafter, referred to as "the fan speed") on the basis of the blowing volume Q of the blower fan 45 and to give a control instruction to cause the blower motor 46 to rotate at the calculated fan speed.

Additionally, the air-conditioning control unit 60 may be further configured to control the state of operation of the compressor 30, the position of the intake door 43 and the position of the air mix door 49, which will be described later.

The vent door 55 may be arranged in the vicinity of the vent air-outlet port 52 and is configured to be rotatable from the fully-opened state to the completely closed state according to the control instruction sent from the air-conditioning control unit 60. Thus, it is possible to adjust the air volume blown out from the vent air-outlet port 52 using the vent door 55.

The foot door 56 may be arranged in the vicinity of the foot air-outlet port 53 and is configured to be rotatable from the fully-opened state to the completely closed state according to the control instruction sent from the air-conditioning control unit 60. Thus, it is possible to adjust the air volume blown out from the foot air-outlet port 53 using the foot door 56.

The defroster door 57 may be arranged in the vicinity of the defroster air-outlet port 54 and is configured to be rotatable from the fully-opened state to the completely closed state according to the control instruction sent from the air-conditioning control unit 60. Thus, it is possible to adjust the air volume blown out from the defroster air-outlet port 54 using the defroster door 57.

The blower motor 46 is configured to control the fan speed of the blower fan 45 according to the control instruction sent from the air-conditioning control unit 60 so as to control the air volume to be blown to the air channel 58.

The air-conditioning display unit 80 may be configured to visually display the state of operation of the air-conditioning unit 40 instructed by the air-conditioning control unit 60 so as to convey the same to the vehicle passenger.

Figure 2:
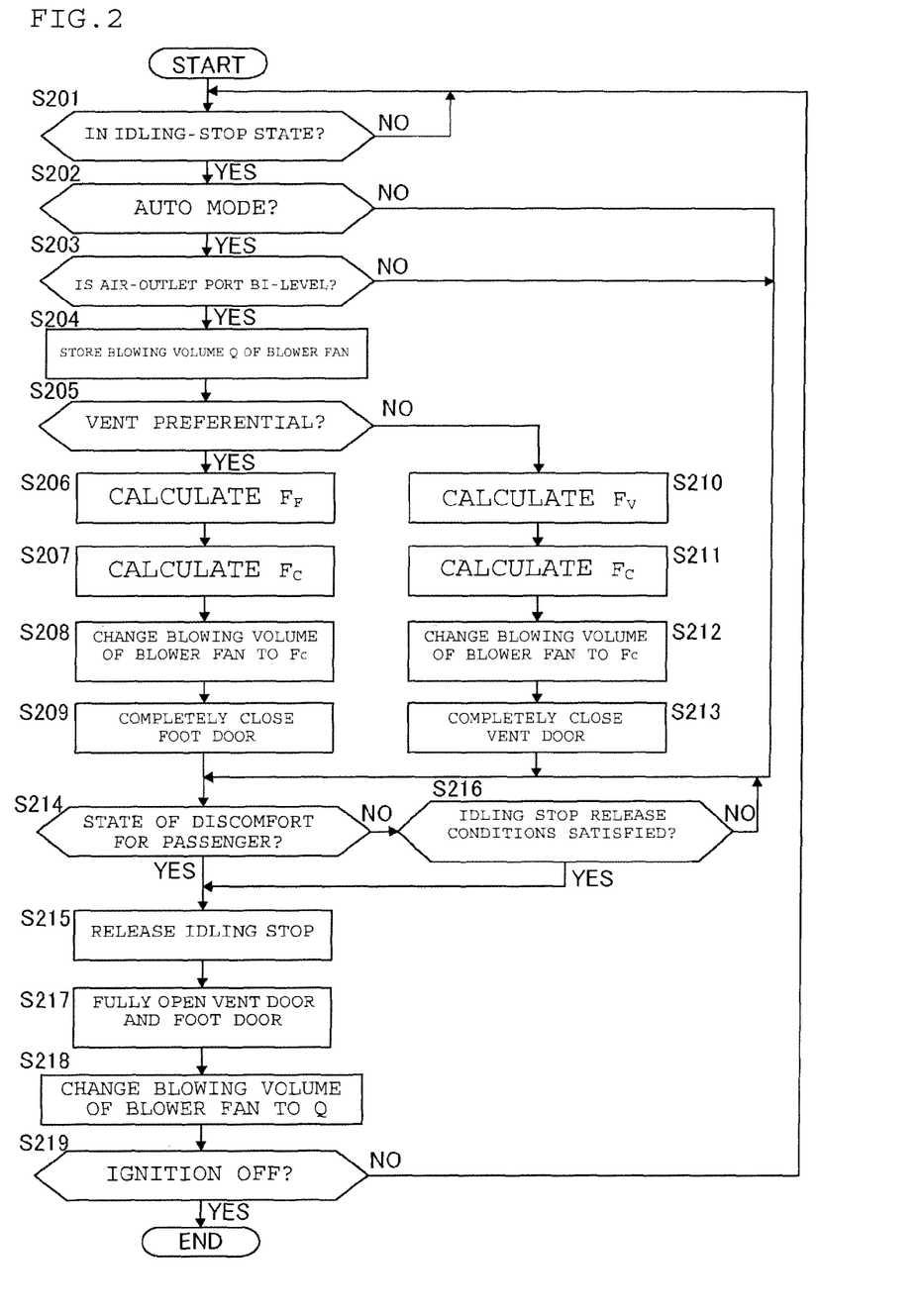
FIG. 2 is a flowchart illustrating an operation of the vehicle air-conditioning control apparatus according to the embodiment of FIG. 1.

A function of the vehicle air-conditioning control apparatus according to an embodiment of the present invention will be described with reference to FIG. 2. The flowchart in FIG. 2 shows the control performed by the vehicle air-conditioning control apparatus according to the embodiment of FIG. 1.

After the start of the engine 10, when the passenger gives an instruction setting the set temperature $T_a$ of the cabin by operating the air-conditioning operating unit 70, the air-conditioning unit 40 starts operations.

In Step S201, the idling stop control unit 20 determines whether or not the vehicle is in the idling stop state. When the vehicle is in the idling stop state, the procedure goes to Step S202, and if not, the procedure goes back to Step S201.

In Step S202, the air-conditioning control unit 60 confirms whether or not the air-conditioning unit 40 is operated in an auto mode. Here, the auto mode is a mode to control the operating state of the compressor 30, the position of the intake door 43, the fan speed of the blower fan 45, the position of the air mix door 49 and the degrees of the openings of the vent door 55, the foot door 56 and the defroster door 57 on the basis of the outside temperature measured by the outside air temperature sensor 90, the cabin temperature measured by the cabin temperature sensor 92, the air-outlet port temperature measured by the air-outlet port temperature sensor 94, the solar radiation amount measured by the solar radiation amount sensor 96, the cooling water temperature of the engine 10 measured by the water temperature sensor 98 and the air temperature after its passage through the evaporator 47 measured by the evaporator temperature sensor 99 so that the temperature in the cabin becomes the temperature $T_a$ set by the passenger using the air-conditioning operating unit 70. When the air-conditioning unit 40 is operated in the auto mode, the procedure goes to Step S203, and if not, the procedure goes to Step S214.

In Step S203, the air-conditioning control unit 60 determines whether or not both of the vent door 55 and the foot door 56 of the air-conditioning unit 40 are in the opened state. A state in which both of the vent door 55 and the foot door 56 of the air-conditioning unit 40 are opened is referred to as the bi-level state (hereinafter, referred to as "the B/L state").

In the B/L state, air may be blown out from the vent door 55 toward an upper body of the passenger sitting on the front seat of the vehicle and from the foot door 56 toward the feet of the passenger sitting on the front seat of the vehicle. When the state of the air-outlet port of the air-conditioning unit 40 is determined to be the B/L state, the procedure goes to Step S204, and if not, the procedure goes to Step S214.

In Step S204, the air-conditioning control unit 60 stores the blowing volume Q of the blower fan 45 and the procedure goes to Step S205. The blowing volume Q may be stored as a fan speed of the blower fan 45.

In Step S205, the air-conditioning control unit 60 determines whether or not the operating state of the air-conditioning unit 40 is a vent-preferential state. Whether or not the operating state is the vent-preferential state is determined by a determination method described later. If the operating state is determined to be the vent-preferential state, the procedure goes to Step S206, and if not, the procedure goes to Step S210.

In Step S206, the air-conditioning control unit 60 calculates an air volume $F_F$ blown out from the foot air-outlet port 53 before the idling stop. The method of calculating the air volume $F_F$ will be described later. The calculated air volume $F_F$ is stored in the air-conditioning control unit 60 and the procedure goes to Step S207.

In Step S207, a value ($F_O$-$F_F$) obtained by subtracting the air volume $F_F$ calculated in Step S206 from a target air volume $F_O$ to be blown from the blower fan 45 is calculated as an air volume after correction $F_c$ in the air-conditioning control unit 60. The target air volume $F_O$ is calculated based on the set temperature $T_a$ and a target air-outlet port temperature $T_d$. The procedure goes to Step S208.

In Step S208, the air-conditioning control unit 60 lowers the rotational speed of the blower motor 46 so as to change the air volume blown from the blower fan 45 to $F_C$ and the procedure goes to Step S209. At this time, when the fan speed of the blower fan 45 is rapidly changed, the air volumes to be blown out from the vent door 55 and the foot door 56 are rapidly changed, which may give the passenger a feeling of discomfort. Therefore, a process of lowering the fan speed of the blower fan 45 may be gradually performed (a slope process).

In Step S209, the foot door 56 is completely closed by the instruction sent from the air-conditioning control unit 60 such that the blowing of air from the foot air-outlet port 53 is stopped. The procedure goes to Step S214.

In contrast, if the operating state is determined not to be in the vent-preferential state in Step S205, the air-conditioning control unit 60 determines that the operating state of the air-conditioning unit 40 is in a foot-preferential state and calculates an air volume $F_V$ blowing out from the vent air-outlet port 52 before the idling stop in Step S210. The method of calculating the air volume $F_V$ will be described later. The calculated air volume $F_V$ is stored in the air-conditioning control unit 60 and the procedure goes to Step S211.

In Step S211, a value $(F_O-F_V)$ obtained by subtracting the air volume $F_V$ calculated in Step S210 from the target air volume $F_O$ is calculated as the air volume after correction $F_C$ in the air-conditioning control unit 60. The target air volume $F_O$ is calculated based on the set temperature $T_a$ and the target air-outlet port temperature $T_d$. The procedure goes to Step S212.

In Step S212, the air-conditioning control unit 60 lowers the rotational speed of the blower motor 46 so as to change the air volume blown from the blower fan 45 to $F_C$ and the procedure goes to Step S213. At this time, when the fan speed of the blower fan 45 is rapidly changed, the air volumes to be blown out from the vent door 55 and the foot door 56 are rapidly changed, which may give the passenger a feeling of discomfort. Therefore, a process of lowering the fan speed of the blower fan 45 may be gradually performed (a slope process).

In Step S213, the vent door 55 is completely closed by the instruction sent from the air-conditioning control unit 60 such that the blowing of air from the vent air-outlet port 52 is stopped. The procedure goes to Step S214.

In Step S214, the air-conditioning control unit 60 determines whether or not the air-conditioning state in the cabin is a state of discomfort for the passenger. When the air-conditioning state is determined to be the state of discomfort, the procedure goes to Step S215. In contrast, when the air-conditioning state is determined not to be the state of discomfort, the procedure goes to Step S216. The determination of whether or not the air-conditioning state in the cabin is the state of discomfort for the passenger may be performed, for example, on the basis of the result of detection of the condition that an absolute value of a difference between an air-outlet port temperature $T_B$ measured by the air-outlet port temperature sensor 94 and a cabin temperature $T_A$ exceeds a predetermined value.

Alternatively, it can be determined that the passenger is in the state of discomfort based on the detection of the condition that the absolute value of the difference between the cabin temperature $T_A$ and the set temperature $T_a$ exceeds a predetermined value.

In Step S215, the idling stop is cancelled by the operation of the idling stop control unit 20, thereby the engine 10 is restarted. Then the procedure goes to Step S217.

In Step S216, whether or not the conditions for cancelling the idling stop are satisfied is determined by the operation of the idling stop control unit 20. If it is determined that the conditions for cancelling the idling stop are satisfied, the procedure goes to Step S215, and if not, the procedure goes back to Step S214.

In Step S217, by the operation of the air-conditioning control unit 60, both of the vent door 55 and the foot door 56 are brought into the opened state and the procedure goes to Step S218.

In Step S218, the air-conditioning control unit 60 gives an instruction to increase the rotational speed to the blower motor 46 so as to change the air volume blown from the blower fan 45 to the blowing volume Q stored in Step S204 and the procedure goes to Step S219. At this time, when the fan speed of the blower fan 45 is rapidly changed, the air volumes to be blown out from the vent door 55 and the foot door 56 are rapidly changed, which may give the passenger a feeling of discomfort. Therefore, a process of increasing the fan speed of the blower fan 45 may be gradually performed (a slope process).

In Step S219, whether or not an ignition is in the OFF state is determined. If the ignition is in the OFF state, the process in FIG. 2 is terminated, and if not, the procedure goes back to S201.

A more detailed description of some of the specific steps of the operation of the vehicle air-conditioning control apparatus will be described.

[Air-Outlet Port Selecting Function]

In order to increase the time during which the comfort level is maintained even though the compressor 30 is stopped by the idling stop function when the air-outlet port is in the B/L state, the air-conditioning control unit 60 performs a control to close one of the vent door 55 and the foot door 56 at the time of idling stop. This function will be described below.

In Step S205, the air-conditioning control unit 60 determines whether or not the operating state of the air-conditioning unit 40 is the vent-preferential state.

The vent-preferential state means a state in which air should be blown from the vent air-outlet port 52 on a priority basis rather than from the foot air-outlet port 53 when the air-conditioning unit 40 is operated in the B/L state. This state mainly occurs when the temperature in the cabin is needed to be lowered quickly (the cool-down state) in which the temperature of the target air-outlet port temperature $T_d$ is lower than the cabin temperature by a predetermined value or more.

Accordingly, the state is determined to be the vent-preferential state on the basis of the fact that the air-conditioning unit 40 is operated in the B/L state before the idling stop, the fact that the air-conditioning environment is in the cool-down state before the idling stop, and the fact that the cabin temperature $T_A$ measured by the cabin temperature sensor 92 during the idling stop is higher than the target air-outlet port temperature $T_d$ by a predetermined value or more.

It can be determined that the air-conditioning environment is in the cool-down state before the idling stop if the cabin temperature $T_A$ before the idling stop is higher than the target air-outlet port temperature $T_d$ before the idling stop by a predetermined value or more.

If it is determined to be the vent-preferential state, a control command A is output from the air-conditioning control unit 60 to the foot door 56 and the foot door 56 is completely closed in Step S209.

In contrast, when it is determined not to be the vent-preferential state, it is determined to be the foot-preferential state. The foot-preferential state means a state in which air should be blown from the foot air-outlet port 53 on a priority basis rather than from the vent air-outlet port 52 when the air-conditioning unit 40 is operated in the B/L state. This state mainly occurs when the temperature in the cabin is needed to be increased quickly (the warm-up state) in which the target air-outlet port temperature $T_d$ is higher than the cabin temperature $T_A$ by a predetermined value or more.

If it is determined to be the foot-preferential state, a control command B is output from the air-conditioning control unit 60 to the vent door 55 and the vent door 55 is completely closed in Step S213.

[Air Volume Control Function]

In order to increase the time during which the comfort level is maintained even though the compressor 30 is stopped by the idling stop function when the air-outlet port is in the B/L state, the air-conditioning control unit 60 performs a control to reduce the volume of air blown from the blower fan 45 and performs a control to close one of the vent door 55 and the foot door 56 at the time of idling stop. This function will be described below.

In Step S206, the air-conditioning control unit 60 calculates the air volume $F_F$ blown out from the foot air-outlet port 53 before the idling stop. The air volume $F_F$ can be calculated from the fan speed of the blower fan 45 before the idling stop, the degree of opening of the vent door 55 at that moment and the degree of opening of the foot door 56 at that moment.

More specifically, the air volume $F_F$ may be calculated by measuring a relationship between the degree of opening of the vent door 55 and the air volume blown out from the vent air-outlet port 52 with respect to the fan speed of the blower fan 45 and a relationship between the degree of opening of the foot door 56 and the air volume blown out from the foot air-outlet port 53 with respect to the fan speed of the blower fan 45 in advance, creating an air volume table $D_1$, storing the air volume table $D_1$ in the air-conditioning control unit 60 and referencing the contents of the air volume table $D_1$ for calculation during operation.

In Step 5210, the air-conditioning control unit 60 calculates the air volume $F_V$ blown out from the vent air-outlet port 52 before the idling stop. The air volume $F_V$ can be calculated from the fan speed of the blower fan 45 before the idling stop, the degree of opening of the vent door 55 at that moment, and the degree of opening of the foot door 56 at that moment and using the air volume table $D_1$ described above.

In Step S207, the calculation of the difference between the target air volume $F_O$ and the air volume $F_F$ blown out from the foot air-outlet port 53 before the idling stop is performed, that is, the air volume after correction $F_C = F_O - F_F$ is calculated.

In Step S208, a control command C is output to the blower motor 46 from the air-conditioning control unit 60, thereby the fan speed (the rotational speed) of the blower motor 46 is changed so that the air volume corresponding to the air volume after correction $F_C$ is blown from the blower fan 45.

In Step S211, the calculation of the difference between the target air volume $F_O$ and the air volume $F_V$ blown out from the vent air-outlet port 52 before the idling stop is performed, that is, the air volume after correction $F_C = F_O - F_V$ is calculated.

In Step S212, the control command C is output to the blower motor 46 from the air-conditioning control unit 60, thereby the fan speed (the rotational speed) of the blower motor 46 is changed so that the air volume corresponding to the air volume after correction $F_C$ is blown from the blower fan 45.

Incidentally, the relationship between the fan speed of the blower motor 46 and an air volume F blown from the blower fan 45 may be measured and arranged in a fan speed table $D_2$ in advance. The fan speed table $D_2$ is stored in the air-conditioning control unit 60. In Step S208 and Step S212, the fan speed of the blower fan 45 corresponding to the air volume after correction $F_C$ is selected by reference to the fan speed table $D_2$, and the air-conditioning control unit 60 outputs the control command C to the blower motor 46 so as to achieve the selected fan speed.

Figure 3A:
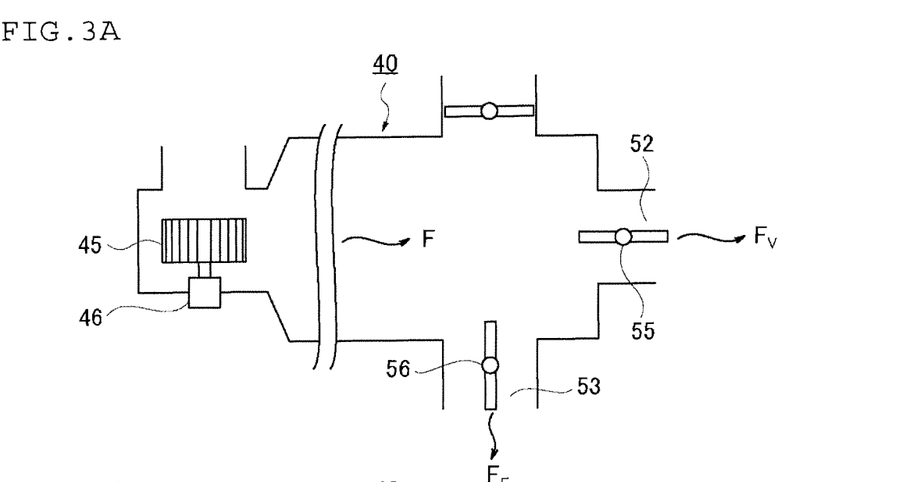
FIG. 3A is a schematic drawing showing a flow of air when both of a vent door and a foot door are opened.

The effects of the air volume control performed in Step S208 and Step S212 will be described with reference to FIGS. 3A to 3C. FIG. 3A shows the operating state of the air-conditioning unit 40 before the idling stop. In other words, the air volume F is blown from the blower fan 45, the air volume $F_V$ is blown out from the vent air-outlet port 52 and the air volume $F_F$ is blown out from the foot air-outlet port 53, with the vent door 55 and the foot door 56 both fully opened.

In the case of FIG. 3A, a relationship of $F = F_V + F_F$ is satisfied between the air volumes F, $F_V$ and $F_F$. Here, the air volume F is calculated by reference to the fan speed table $D_2$ described above. The air volumes $F_V$ and $F_F$ are calculated, under the condition where the air volume blown from the blower fan 45 is F and the doors 55 and 56 are fully opened. The air volumes blown out from the vent door 55 and the foot door 56, respectively, are determined by reference to the air volume table $D_1$ previously stored in the air-conditioning control unit 60.

Figure 3B:
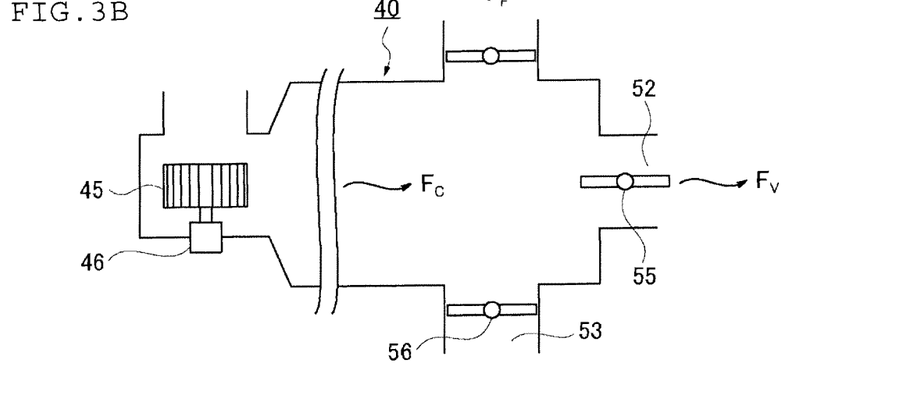
FIG. 3B is a schematic drawing illustrating the flow of air when only the vent door is opened.

FIG. 3B shows a state in which the control in Step S209 in FIG. 2 is performed with the foot door 56 being completely closed when the vehicle is in the idling stop state. At this time, given that the air volume blown from the blower fan 45 is $F_C$, the value of the $F_C$ is calculated in Step S207.

In the case of FIG. 3B, a relationship of $F_C = F - F_F = F_V$ is satisfied. Hence even though the air volume blown from the blower fan 45 is reduced by an amount corresponding to the air volume $F_F$ blown from the foot air-outlet port 53 before the idling stop, the air volume $F_V$ blown out from the vent air-outlet port 52 can be kept in the state before the idling stop.

Figure 3C:
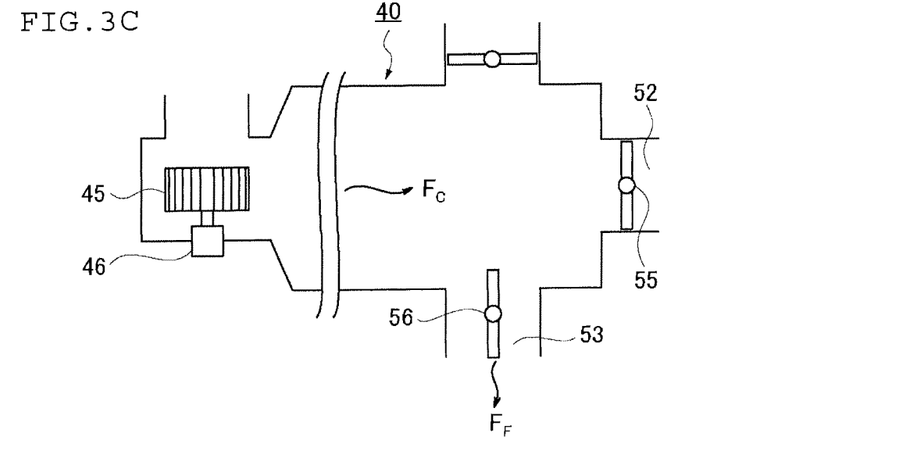
FIG. 3C is a schematic drawing illustrating the flow of air when only the foot door is opened.

FIG. 3C shows a state in which the control in Step S213 in FIG. 2 is performed in which the vent door 55 is completely closed when the vehicle is in the idling stop state. At this time, given that the air volume blown from the blower fan 45 is $F_C$, the value of the $F_C$ is calculated in Step S211.

In the case of FIG. 3C, a relationship of $F_C = F - F_V = F_F$ is satisfied. Hence even though the air volume blown from the blower fan 45 is reduced by an amount corresponding to the air volume $F_V$ blown out from the vent air-outlet port 52 before the idling stop, the air volume $F_F$ blown out from the foot air-outlet port 53 can be kept in the state before the idling stop.

The effects and advantages of the above arrangement will be described. As describe above, the embodiment employs a first configuration in which one of the vent door 55 and the foot door 56 is selected on the basis of the air-conditioning environment in the cabin before the idling stop, and at the time of idling stop is closed in accordance with the instruction from the air-conditioning control unit 60 if both of the vent door 55 and the foot door 56 are opened when the engine 10 is stopped due to the operation of the idling stop control unit 20, by the air-outlet port selecting function described above. By the first configuration, the prioritized air volume blown out toward the upper body of the passenger or the foot of the passenger (that is, the air volume that the passenger mainly feels) during the idling stop can be kept at the same level as the air volume before the idling stop, thereby the comfort level for the passenger can be almost maintained.

Also, the embodiment further employs a second configuration in which the blowing volume of the blower fan 45 is reduced by an amount corresponding to the air volume blown out from the closed door before the idling stop, by the air volume control function described above. By the second configuration, the air volume passing through the evaporator 47 is reduced during the idling stop, thereby the temperature rise of the evaporator 47 can be made gentle even though the compressor 30 is stopped due to the idling stop function. This means that the time during which the evaporator 47 can cool the air blown to the evaporator 47 while the compressor 30 is stopped due to the idling stop function can be increased. As a result, the time during which the air-conditioning environment in the cabin is comfortably maintained can be increased and the time until the idling stop function is cancelled and the engine 10 is restarted because of deterioration of the air-conditioning environment in the cabin can be increased.

According to one embodiment, control to completely close one of the vent door 55 and the foot door 56 is performed. However, in another embodiment of the present invention, the control to simply reduce the degree of opening of one of the vent door 55 and the foot door 56 is also applicable. In other words, the degree of opening of the foot door 56 may be specified by the control command A and the degree of opening of the vent door 55 may be specified by the control command B. In this configuration, the degree of opening of the vent door 55 or the foot door 56 can be finely controlled. Hence, the difference between the air-conditioning environment before the idling stop and the air-conditioning environment during the idling stop may be reduced. Accordingly, the continuance of the comfort level for the passenger is achieved.

According to another embodiment of the present invention, the air-conditioning control unit 60 may be configured to perform a control to determine whether the intake door 43 is in the state of bringing the outside air through the outside air-inlet port 41 or in the state of circulating the air in the cabin (the inside air) through the inside air-inlet port 42 when the vehicle is brought into the state of the idling stop and to send an instruction to the intake door drive unit 44 to rotate the intake door 43 and close the outside air-inlet port 41 and circulate the inside air through the inside air-inlet port 42 when the intake door 43 is in the state of bringing the outside air through the outside air-inlet port 41. By performing the control of the intake door 43 in this manner, the intake door 43 is switched to the position of the inside air circulation during the idling stop. Therefore, the inlet of the outside air (which may cause the temperature to rise or to lower in the cabin) is blocked, and hence the temperature change in the cabin is diminished. Consequently, the time during which the comfort level can be maintained may further be increased, and the time until the restart of the engine may further be increased.

Although an embodiment of the present invention has been described with reference to the drawings, the embodiment is given only for illustrative purposes. Therefore, the invention is not limited to the embodiment described in the drawings, and any modification in design without departing from the scope of the invention is included in the invention. When a plurality of features is included in an embodiment, any possible combination of the features may be included in the invention as a matter of course even without specifically described. In addition, a plurality of embodiments or modifications are described. Any possible combinations of the aspects provided in these embodiments or modifications may be included in the invention as a matter of course even without specifically described. For example, any single feature of one embodiment of the present invention may be used in any other embodiment of the present invention. Features illustrated in the drawings may be included in the invention as a matter of course even without specifically described. Furthermore, when the term "and the like" is mentioned, it is used in the sense of including equivalents. When the terms "substantially," "approximately," and "on the order of" are used, they are used in the sense of including a range or accuracy approved on the basis of common sense.

The priority application Japanese Patent Application No. 2011-234009, filed Oct. 25, 2011, is incorporated by reference herein.

What is claimed is:

1. An air-conditioning unit for a vehicle that has an idling stop function, comprising:
a blower fan configured to blow air;
a first air-outlet port configured to permit air blown from the blower fan toward a first portion of a vehicle cabin;
a second air-outlet port configured to permit air blown from the blower fan toward a second portion of the vehicle cabin; and
an air-conditioning controller configured to:
set a target air-outlet port temperature of the air blown from the first and second air-outlet ports on a basis of a preset temperature and an environmental condition of the vehicle,
if the blower fan is operating to blow air from both of the first and second air-outlet ports before the vehicle is brought into an idling stop state, and then the vehicle is brought into the idling stop state, cause a controlled reduction in an air volume blown from at least one of the first or second air-outlet ports during the idling stop state, wherein the controlled reduction is performed during the idling stop state, and
cancel the controlled reduction when the idling stop state is cancelled,
wherein the first portion of the vehicle cabin is an upper portion of the vehicle cabin, and the second portion of the vehicle cabin is a lower portion of the vehicle cabin.

2. The air-conditioning unit according to claim 1, wherein the air-conditioning controller is configured to:
cause the controlled reduction in the air volume blown from the at least one of the first or second air-outlet ports starting when the idling stop state is entered, and
cancel the controlled reduction when the idling stop state is canceled.

3. The air-conditioning unit according to claim 1, further comprising a compressor, powered by a vehicle engine, configured to compress coolant; and an evaporator configured to cool air blown from the blower fan using the coolant compressed by the compressor.

4. The air-conditioning unit according to claim 3, wherein the compressor is configured to be stopped during the idling stop, and to be restarted when an idling stop release condition is satisfied or a state of discomfort in the vehicle cabin is detected in the idling stop state.

5. The air-conditioning unit according to claim 1, wherein the air-conditioning controller is configured to calculate a cabin temperature of the vehicle and to determine the air volume to be reduced when the vehicle is brought into the idling stop state based on (i) the target air-outlet port temperature, (ii) the cabin temperature before the vehicle is brought into the idling stop state, and (iii) the cabin temperature when the vehicle is in the idling stop state.

6. The air-conditioning unit according to claim 1, wherein the air-conditioning controller is configured to reduce the air volume blown from the at least one of the first or second air-outlet ports during the idling stop state by an amount corresponding to an air volume blown out from the at least one of the first or second air-outlet ports before the vehicle is brought into the idling stop state.

7. The air-conditioning unit according to claim 1, wherein the air-conditioning controller is configured to reduce the air volume blown from the at least one of the first or second air-outlet ports during the idling stop state by reducing the air volume to be blown by the blower fan.

8. The air-conditioning unit according to claim 7, wherein the air-conditioning controller is configured to reduce the air volume to be blown by the blower fan gradually in a sloped manner.

9. The air-conditioning unit according to claim 1, wherein the air-conditioning controller is configured such that air blown from the blower fan is recirculated from the vehicle cabin when the vehicle is in the idling stop state.

10. The air-conditioning unit according to claim 1, further comprising a first door configured to be rotatable to block the air flow through the first air-outlet port and a second door configured to be rotatable to block the air flow through the second air-outlet port, wherein the air-conditioning controller is configured to reduce the air volume blown from the at least one of the first or second air-outlet ports by changing an opening degree of at least one of the first or second doors.

11. The air-conditioning unit according to claim 1, wherein the air-conditioning controller is configured to cause the controlled reduction in the air volume blown based on at least one sensed parameter.

12. An air-conditioning unit for a vehicle that has an idling stop function, comprising:
    a blower fan configured to blow air into a vehicle cabin;
    a compressor, powered by a vehicle engine, configured to compress coolant;
    an evaporator configured to cool air blown from the blower fan using the coolant compressed by the compressor;
    a first air-outlet port configured to permit air blown from the blower fan toward an upper portion of the vehicle cabin;
    a second air-outlet port configured to permit air blown from the blower fan toward a lower portion of the vehicle cabin; and
    an air-conditioning controller configured to:
        set a target air-outlet port temperature of air blown from the first and second air-outlet ports based on a temperature set by a vehicle passenger and an environmental condition of the vehicle,
        change an air volume to be blown by the blower fan,
        in a case where air is blown from both of the first and second air-outlet ports before the vehicle is brought into an idling stop state and then the vehicle is brought into the idling stop state, operate a control to reduce an air volume blown from at least one of the first or second air-outlet ports when the vehicle is brought into the idling stop state, wherein the control to reduce the air volume is performed during the idling stop state, and
        stop the control when the idling stop state is cancelled.

13. The air-conditioning unit according to claim 12, wherein the air-conditioning controller is configured to reduce the air volume blown from the at least one of the first or second air-outlet ports when the vehicle is brought into the idling stop state on a basis of (i) the target air-outlet port temperature, (ii) a cabin temperature of the vehicle calculated by the air-conditioning controller before the vehicle is brought into the idling stop state, and (iii) the cabin temperature of the vehicle when the vehicle is brought into the idling stop state.

14. The air-conditioning unit according to claim 12, wherein the air-conditioning controller is configured to reduce the air volume blown from the at least one of the first or second air-outlet ports by an amount corresponding to the air volume blown from the at least one of the first or second air-outlet ports before the vehicle is brought into the idling stop state.

15. The air-conditioning unit according to claim 12, wherein the air-conditioning controller is configured to reduce the air volume blown from the at least one of the first or second air-outlet ports by reducing an air volume to be blown from the blower fan.

16. The air-conditioning unit according to claim 12, wherein the air-conditioning controller is configured to reduce the air volume blown from the at least one of the first or second air-outlet ports by changing an opening degree of a door that is configured to block the air flow from the one of the first or second air-outlet ports.

17. The air-conditioning unit according to claim 12, wherein the air-conditioning controller is configured to operate the control to reduce the air volume based on at least one sensed parameter.

18. A method of air-conditioning in a vehicle having an idling stop function, comprising:
    blowing air through a first air-outlet port toward a first portion of a vehicle cabin and blowing air through a second air-outlet port toward a second portion of the vehicle cabin before an idling stop state;
    bringing the vehicle into the idling stop state;
    causing, by an air-conditioning controller, a controlled reduction in an air volume blown through at least one of the first or second air-outlet ports during the idling stop state, wherein the controlled reduction is performed during the idling stop state; and
    canceling the controlled reduction when the idling stop state is cancelled,
    wherein the first portion of the vehicle cabin is an upper portion of the vehicle cabin, and the second portion of the vehicle cabin is a lower portion of the vehicle cabin.

19. The method according to claim 18, further comprising setting a target air-outlet port temperature of the air blown through the first and second air-outlet ports on a basis of a preset temperature and an environmental condition of the vehicle.

20. The method according to claim 18, wherein the controlled reduction in the air volume blown through the at least one of the first or second air-outlet ports starts when the idling stop state is entered, and the controlled reduction is canceled when the idling stop state is canceled.

21. The method according to claim 18, wherein the controlled reduction in the air volume blown through the at least one of the first or second air-outlet ports is performed by at least one of reducing the air volume to be blown by a blower fan or rotating a door such that the air flow through the at least one of the first or second air-outlet ports is at least partially blocked.

22. The method according to claim 18, wherein the air-conditioning controller is configured to cause the controlled reduction in the air volume blown based on at least one sensed parameter.

* * * * *